United States Patent Office 2,967,759
Patented Jan. 10, 1961

---

2,967,759

MANUFACTURE OF HF

Eugene Wainer, Cleveland Heights, Ohio, assignor to Horizons Incorporated, Cleveland, Ohio, a corporation of New Jersey No Drawing. Filed Feb. 2, 1959, Ser. No. 790,349

4 Claims. (Cl. 23—153)

This invention relates to a process for the manufacture of hydrogen fluoride. More particularly it relates to processes for the recovery of the fluorine content of readily available mineral fluorides such as calcium fluoride, for example, in the form of HF by treatments of melts of such minerals with suitable gaseous treating agents.

In general hydrogen fluoride or hydrofluoric acid as it is commonly styled, is produced commercially by the action of sulfuric acid or other inexpensive mineral acid on fluoride containing materials, the reaction conditions being chosen so that the HF is evolved as a gas and thereby recovered separately from the remaining materials.

The required acids represent a severe economic limitation on the process and have caused others to seek procedures free of this disadvantage, as for example is possible in the direct combination of hydrogen and fluorine.

By the present invention the expense incident to the use of acid or the use of elemental fluorine is avoided and an economically feasible relatively direct process is provided.

Briefly, in a preferred embodiment of the invention a molten fluoride, e.g. calcium fluoride, is brought into intimate contact with a hydrocarbon gas such as natural gas, at temperatures at least as high as 1650° C. and preferably as high as 2750° C. As a result hydrogen fluoride is produced by a reaction not entirely understood. The hydrogen fluoride so produced is recovered from the gaseous effluent preferably by cooling the gaseous products and condensing the HF.

Instead of calcium fluoride, other fluoride-containing minerals may be employed, but because of the possible side reactions involved when complex minerals such as fluorapatites are used, it is preferred to provide the fluorine in the melt in the form of a simple fluoride of the group consisting of alkali metal fluorides and alkaline earth fluorides, including magnesium fluoride. Other salts may be present in the melt provided that they are more stable than the fluorides taking part in the reaction, under the contemplated reaction conditions. Such other salts include alkali metal chlorides often found as impurities in the fluoride minerals, or deliberately added to impart specific properties to the melt.

Once the fluoride mineral has been melted it is brought into intimate association with the hydrogen supplying reactant. One comparatively simple procedure is to sparge a finely divided stream of hydrocarbon gas into the fluoride melt, whereby intimate contact is readily achieved. Another effective procedure is to rain the fluoride melt through a stream of hydrocarbon gas.

Instead of a hydrocarbon gas such as natural gas, other hydrogen-containing gases may be used including those in which free hydrogen is present, as well as those in which the hydrogen is in combined form, e.g. as hydrogen sulfide.

The presence of traces of $H_2O$ have been found to greatly accelerate the decomposition of the fluoride, it being merely necessary to add as little as 0.1% by weight of water vapor to the entrant hydrogen supplying gases, in order to obtain a noticeable increase in the evolution of HF.

The following example will serve to further illustrate certain aspects of my invention and is to be considered illustrative thereof rather than limitative.

*Example*

One thousand sixty-one (1,061) grams of calcium fluoride were melted in a graphite vessel and the resulting melt was maintained at about 1700° C. while natural gas was sparged through the melt at the rate of three (3) cubic feet per hour for a period of about 90 minutes. The off-gases evolved from the melt were passed through a series of traps consisting first of a dust trap, then a cold trap maintained at minus 30° F. and finally into a water bath. Although no condensate of HF was obtained in the cold trap, it was noted that the liquid trap (water bath) experienced a change in pH of from 6 to 1. The liquid was tested and found to contain HF. Obviously with more effective cold trapping, the HF could be recovered as an anhydrous liquid instead of as the aqueous solution actually obtained.

The yields of HF increase rapidly with increasing temperature of the melt as the temperature of the melt is increased above 1650° C. and as a consequence, while my process is operable at temperatures as low as 1650° C., it is preferred to operate within the range of 1730° C. to 2750° C., for increased yield.

I claim:

1. A process for producing hydrogen fluoride which comprises bringing a gas selected from the group consisting of hydrogen and hydrocarbon gases into contact with a salt melt containing a molten fluoride from the group consisting of alkali metal fluorides, alkaline earth metal fluorides and magnesium fluoride, while maintaining the temperature between 1650° C. and 2750° C. and recovering the HF produced by separating the HF from the off-gases.

2. The process of claim 1 wherein the gas is hydrogen and the fluoride is calcium fluoride.

3. The process of claim 2 wherein the HF is separated from the off-gases by condensation.

4. The process of claim 1 wherein there is also present in the gas about 0.1% by weight of $H_2O$.

References Cited in the file of this patent

UNITED STATES PATENTS 2,382,788     Gorin                 Aug. 14, 1945

OTHER REFERENCES

Ser. No. 292,742, Beck et al. (A.P.C.), published July 13, 1943.

Mellor's Comprehensive Treatise on Inorganic and Theoretical Chemistry, Supplement II, Part I, Longmans, Green and Co., New York, 1956, page 73.